United States Patent [19]

Smith et al.

[11] 3,812,224
[45] May 21, 1974

[54] PROCESS FOR THE PRODUCTION OF POROUS POLYMERIC MATERIALS

[75] Inventors: Albert Ernest Smith; James Charles Ingram, both of Sarnia, Ontario, Canada

[73] Assignee: Polysar Limited, Sarnia, Ontario, Canada

[22] Filed: Mar. 13, 1972

[21] Appl. No.: 234,318

Related U.S. Application Data

[63] Continuation of Ser. No. 22,387, March 24, 1970, abandoned.

[30] Foreign Application Priority Data

May 5, 1969 Canada.............................. 050500

[52] U.S. Cl............ 264/28, 161/159, 260/2.5 M, 264/45, 264/49, 264/101, 264/331, 264/DIG. 5, 264/DIG. 13, 264/DIG. 17
[51] Int. Cl............................................ B29d 27/00
[58] Field of Search ........... 264/28, 41, 49, 45, 101, 264/331, DIG. 13, DIG. 17, DIG. 5; 260/2.5 M

[56] References Cited
UNITED STATES PATENTS

| | | | |
|---|---|---|---|
| 2,187,146 | 1/1940 | Calcott et al. | 264/28 |
| 3,236,788 | 2/1966 | Smith-Johannsen | 264/41 UX |
| 3,376,158 | 4/1968 | Buser | 264/28 UX |
| 3,516,935 | 6/1970 | Monforte et al. | 264/28 X |

FOREIGN PATENTS OR APPLICATIONS

44-22,631  9/1969  Japan................................... 264/28

Primary Examiner—Philip E. Anderson
Attorney, Agent, or Firm—Stevens, Davis, Miller & Mosher

[57] ABSTRACT

A porous cellular composition is made by freezing a plastically deformable or pourable system containing a solid polymer and a compatible liquid which is capable of freezing to a crystalline state and then subliming the liquid.

The composition contains interconnecting cells of not more than 1,000 microns in width and is suitable for the production of leather-like breathable sheets, filter elements and non-woven fabrics.

6 Claims, No Drawings

PROCESS FOR THE PRODUCTION OF POROUS POLYMERIC MATERIALS

This is a continuation of application Ser. No. 22,387, filed Mar. 24, 1970, and now abandoned.

This invention relates to the process of producing porous macromolecular materials. In particular, it relates to porous structures of solid polymers and articles made therefrom.

Porous compositions of high molecular weight rubbery or resinous polymers are well known in the art. Many methods have been developed for the production of such compositions: one method involves whipping air into a rubber latex and then gelling the whipped latex to produce a rubber latex foam; in another method, gas or volatile solvent is introduced into a homogeneous plastic mass and pores of the desired size are formed by expanding the gas bubbles by the application of heat or reduced pressure; and in a further method, gas e.g. $CO_2$ or $H_2O$, is evolved during the formation of polymer blowing up the polymer to form porous structures. These methods produce porous compositions having non-uniform pores ranging from about 0.1 mm to about 100 mm. The physical properties of such compositions are variable and often unsatisfactory.

It is an object of this invention to provide a new process for the production of porous compositions. Another object of this invention is to provide a novel porous composition.

In accordance with this invention, a process is provided for the production of a porous composition comprising at least one non-flowable macromolecular material, which process comprises forming a compacted solidified composition of said material, said solidified composition having homogeneously dispersed therein, in crystalline form, at least one liquid which is compatible with said non-flowable material, and removing by sublimation substantially all of said liquid.

The porous cellular composition produced by this process consists of solid walls and interconnecting cells, the walls being of a composition comprising at least one non-flowable macromolecular material, said cells being not more than about 1,000 microns in width, and the volume fraction of said walls in said cellular composition being less than 0.8.

NON-FLOWABLE MATERIAL

The non-flowable material which can be used in this invention is a solid macromolecular material. It may be a natural product or a synthetic material such as is produced by the polymerization of one or more polymerizable compounds. The polymerizable compound may be a monoolefin, diolefin or a multi-olefin; a hydrocarbon, or a polar organic compound with at least one polar group attached to the olefinic group, an epoxide or an aziridine compound. Representative examples of monomeric compounds which can be used for the preparation of polymers used in this invention are hydrocarbons such as ethylene, propylene, butene-1, iso-butene, pentene-1, butadiene-1,3, isoprene, pentadiene-1,3, styrene, alpha methyl styrene, vinyl toluene, polar compounds such as vinyl chloride, vinyl acetate, vinyl alcohol, acrylic acid and methacrylic acid, their esters, nitriles and amides, vinylidene chloride, vinylidene cyanide, vinyl pyridine, propylene oxide, propylenimine, ethylenimine. Condensation polymers such as polyesters, polyethers or polyarylenes can also be used.

The molecular weight of the polymer may vary from about $10^3$ to above $5 \times 10^6$; the lower molecular weights are preferred for the ease of handling in the presence of liquids or solvents in accordance with the process of this invention, while, on the other hand, the higher molecular weight polymers are valued for the physical properties they impart to porous structures of this invention. The polymer may be a linear or branched polymer that can be solvated or preferably dissolved in a suitable liquid. Highly cross-linked polymers which show a limited swelling in solvents are not suitable for the process of this invention.

The polymer is non-flowable, i.e. dimensionally stable, preferably at temperatures at which the porous compositions are made and used. In general, polymers which are solid and non-flowable at a temperature of more than about −25° C can be used, although those which are non-flowable at not less than about 10° C are preferred. The non-flowability, i.e. dimensional stability of polymer depends primarily on the first or second order transition temperature. The first order transition temperature, popularly called melting point, is observed in crystalline polymers; the second order transition temperature is known as glass transition temperature. The polymer is plastically deformable when it is above the said transition temperatures; otherwise, it is firm and non-flowable.

Representative examples of non-flowable polymers having a high second order (glass) transition point of more than about −25° C are emulsion copolymers of isoprene with more than 30 percent acrylonitrile, copolymers of dimethyl butadiene-1,3 at least 25 percent of styrene or acrylonitrile, polystyrene, butadiene-styrene copolymers containing more than 50 percent of styrene, polymethyl methacrylate, polyvinyl acetate, polyvinyl alcohol, polyvinyl chloride, copolymers of vinyl chloride with vinyl acetate or vinylidene chloride, styrene-acrylonitrile copolymers and styrene-acrylonitrile-butadiene terpolymers and graft copolymers and block copolymers of vinylidene aromatic hydrocarbons with conjugated diolefins of the ABA type. Condensation polymers such as polyesters, polyethers, polyarylenes and polycarbonates also have a high second order transition point and are normally non-flowable. Block copolymers of the ABA type where A is a polymeric block having a high first or second order transition point e.g. polyethylene, polypropylene, polystyrene, polyalpha methyl styrene, and B is a polymeric block having a low transition point of less than −25° C such as polybutadiene, polyisoprene, ethylene-propylene copolymer and polyisobutylene, are representatives of flexible thermoplastics, and are preferably used in the process of this invention for the production of flexible porous products.

The term "non-flowable polymers" includes also crystalline polymers having a high first order transition temperature and more than about 10 percent of X-ray detectable crystallinity at a temperature of about −25° C, preferably about 10° C. Representative examples of such polymers are: polyethylene, isotactic polypropylene, crystalline ethylene-propylene copolymers, trans-1,4 polyisoprene, trans-1,4 polybutadiene, syndiotactic-1,2 polybutadiene, crystalline polychloroprene, crystalline polybutene, poly (chlorotrifluoroethylene), polypropylene oxide, and polyethylene oxide. The above and other crystalline polymers and their melting points are listed in Polymer Handbook, J. Brandrup and E. H. Immergut, Interscience Publishers, New York-London-Sydney (1966) Part III, pages 32–57.

In the category of essentially non-flowable polymers that can be used in this invention are also polymers which are neither crystalline nor of a high second order transition point, but are of a high molecular weight and/or highly branched such that they are essentially free of cold flow. They may be made permanently non-flowable by cross-linking during the process of this invention in the solidified liquid-polymer system, or in the porous form, i.e. after this process is completed. Such polymers include amorphous polybutadiene, copolymers of butadiene or isoprene with minor amounts of styrene or acrylonitrile.

POLYMER - LIQUID SYSTEM

Prior to the use in the process of this invention, the non-flowable macromolecular material such as a polymer or a mixture of polymers is dispersed in a liquid to form a plastically deformable system, preferably a system that is pourable at an ambient temperature of from about 20° C to about 150° C. The liquid must be capable of freezing to a crystalline state and should be compatible with the polymer. It must at least swell the polymer and form, at least in part, a homogeneous phase containing both components. Preferably it should be a solvent for the selected polymer. It is preferred to use solvents which have a high freezing point of not less than about −25° C, although other solvents can also be used. The selection of the liquid or solvent will depend on the chemical nature of the polymer: hydrocarbon solvents such as benzene, toluene, cyclohexane, octane, are preferably used for hydrocarbon polymers; halogenated solvents such as perchloroethylene, dichlorobenzene, or carbon tetrachloride can be used for halogenated polymers and hydrocarbon polymers; ethers, ketones, nitriles and alcohols such as dioxane are suitable for polar polymers containing ether, ketone, nitrile and hydroxyl groups; acetic acid and water are useful for polymers containing a plurality of hydroxyl, carboxyl or ether groups. Benzene and cyclohexane having high freezing points of 5.5° C and 6.5° C, respectively, are preferred solvents for hydrocarbon polymers and for polar polymers containing a minor proportion of polar monomer units. 1,4-dichlorobenzene having a freezing point of 53° C is preferably used as a solvent in the process of freezing and subliming carried out at temperatures between about 5 and 50. If desired, a mixture of solvents may be used for the preparation of a plastically deformable polymer-liquid system.

The concentration of the polymer in the polymer-liquid system may vary within wide limits, from about 0.5 percent to about 80 percent by weight. Of course, the maximum concentration level will depend on the molecular weight of the polymer: the higher the molecular weight, the lower must be the concentration to assure that the system is plastically deformable and preferably pourable. Low concentrations of about 2–10 percent are preferred when a very light and porous structure is desired. Higher concentrations of about 20 to 60 percent are preferable for the production of strong porous compositions having a high resistance to tear, compression and stretching.

The polymer-liquid system used in the process of this invention may contain a mixture of two or more polymers. The second and other polymers should be compatible with the non-flowable first polymer and form a polymer mixture which is non-flowable per se, but is at least plastically deformable in the presence of solvents. In addition to polymers, the polymer-liquid systems may contain additives conventionally used in polymer compounding such as antioxidants, stabilizers, dyes, curatives, plasticizers, resins, waxes and fillers. Solid fillers or reinforcing agents can be used preferably in amounts of less than about 100 parts by weight per 100 parts of polymer.

FREEZING

The deformable polymer-liquid system described above is shaped to a desired form, preferably in a mould; shaping under pressure may be necessary when the viscosity is very high or when the temperature is above the boiling point of the liquid present in the system. It is important that the polymer-liquid system after shaping is homogeneous without any sign of stratification or internal stresses. It may be desirable to raise the temperature so that the plastic system can relax. The shaped system is then subjected to a cooling temperature which may be any temperature below the melting point of the solvent. As it reaches the melting point, the solvent freezes and a dispersed phase of solvent crystals is formed; the system is concentrated until a solid nearly solvent-free polymer phase is formed enveloping individual crystals. The thickness of the solid polymer walls between crystals is determined by the amount of polymer present in the system and by the number and size of crystals; since the number and size of solvent crystals is governed, among other things, by the temperature of freezing, the cell size and the thickness of the walls in the final porous composition are also controlled by the temperature of freezing. As the temperature of freezing is reduced substantially below the melting point of the solvent, the number and fineness of solvent crystals increases, resulting in finer cells and thinner walls of the porous composition. Temperatures at least 10° C below the freezing temperature of the solvent or the predominant solvent are preferred. In the case of polymer solutions in benzene, the freezing temperature may vary between 0° C and about −50° C. In the case of 1,4-dichlorobenzene, the freezing temperature is suitably between 0° C and 50° C.

It is preferred that the polymer-liquid system is uniformly cooled throughout the entire volume and that the temperature gradient during freezing is small. For that purpose, the plastic system is shaped so that at least one dimension is small, preferably about 50 mm or less. However, where the uniformity of cell size is not essential, bulkier shapes can be used. It may be of advantage to cool the solution in two stages: firstly, at a temperature just above the melting point and then at the desired freezing temperature.

As the polymer-liquid system cools and freezes, it contracts; areas of low or negative pressure are formed in the mould and as a result frozen systems show cracks and irregular striae. These irregularities are avoided in accordance with this invention when the freezing polymer-liquid system is subjected to a compacting force such as an external pressure. The pressure should be positive and sufficient to cause the polymer phase to flow to form a compacted composition. Depending on the size and dimensions of the solidified composition and the viscosity of the polymer during freezing, the pressure may vary from a fraction of 1 atmosphere to above 1,000 atmospheres. The freezing system may also be subjected to a vibratory motion whereby the internal stresses are reduced and a satisfactorily compacted solidified composition is produced.

As mentioned above, a mould is preferably used for shaping and freezing. Pourable polymer-liquid systems are preferably shaped in a closed pressure mould. It is, however, possible to shape and freeze polymer-liquid systems in a die or an extruder without the use of moulds.

DRYING

In the next step, the solidified and compacted liquid-polymer composition having the desired dimensions is subjected to a reduced pressure below the pressure of the triple point of the solvent. A maximum area of the composition should be exposed to the said reduced pressure so as to prevent localized melting of solvent crystals and re-dissolution of desolvatized polymer. For that purpose, it is preferable to place the frozen composition on a support in a vacuum chamber. When the composition is in a closed mould, satisfactory results may be obtained with the lid taken off the mould, provided the frozen composition is less than about 25 mm thick. Solvent vapours arising from said frozen composition are removed by a vacuum pump and condensed as crystals on a cooled surface held under vacuum. The temperature of the solidified composition is maintained below the melting point of at least one of the solvents present. The polymeric walls separating individual crystals are believed to break in weak spots during this drying step; as a result, a porous composition is formed containing interconnecting cells. The size of the cells is essentially the same as the size of crystals.

In the case of frozen compositions containing benzene or cyclohexane, the reduced pressure should be maintained below an absolute pressure of about 35 millimeter of mercury, until substantially all solvent sublimes. When carbon tetrachloride, water or acetic acid is used as the solvent for the polymer, the absolute pressure during sublimation must be below 6.8, 4.5 and 9.2 mm Hg, respectively. In the case of a solvent that is solid at room temperature e.g. 1,4-dichlorobenzene, the sublimation may be carried out slowly at atmospheric pressure without any danger of melting of solvent crystals. It can be appreciated that solvents, the vapour pressure of which at the triple point is 1 mm Hg or less, are useful but impractical, since they would require a high vacuum equipment, pump and sublimation chamber, and the operation on a commercial scale would be expensive. After the porous composition is substantially freed from solvent and the polymer phase becomes non-flowable, the temperature may be raised to a point below softening point, i.e. below the melting point of crystalline polymers or below the second order transition point in case of thermoplastic polymers and vacuum may be applied at that temperature to completely remove the residual solvent in the polymer.

POROUS COMPOSITIONS

The porous compositions produced by this process are characterized by a cellular structure having interconnecting cells of not more than about 1,000 microns in width, preferably less than about 500 microns. The shape and size of the cells vary depending on the type of polymer and solvent used as well as the process of freezing and subliming. It is possible to produce a structure having a narrow distribution of cell sizes, where the maximum and the minimum cell width differs from the average width by a factor of less than about three. The cells are sometimes honeycomb as in the case of trans-polyisoprene recovered from frozen benzene solution, sometimes elongated and oriented in the direction of vapour removal as in polystyrene obtained from benzene solution. In other cases, the interconnecting cells form labyrinth-passages separated by thin walls. The thickness of the walls is uniform; it depends primarily on the concentration of the polymer solution used in the process and may vary from about 2 microns to 50 microns.

The strength of the porous structure, that is, the tensile strength, modulus, resistance to tear or compression all depend on density, that is, the amount of the non-flowable polymer material per unit volume of the porous structure and normally the weakest part of the structure determines the strength of the whole structure. The present compositions are stronger than the compositions of similar density of the prior art; they can be used in applications where a low density, high porosity and a strength commensurate with the density is required. If physical strength is the overriding criterion for rating the porous composition, a polymer is selected which is inherently strong or can be made strong by proper compounding. Since the process of moulding and freezing imposes certain restrictions on the selection of compounding ingredients, reinforcement may be conveniently achieved by using reinforcing elements, e.g. loose fibers, non-woven or woven fabrics and saturating them with the plastic polymer-liquid system prior to freezing. Reinforcing elements may also be applied to porous compositions performed in accordance with this process.

The porous composition of this invention is characterized by a surprisingly high permeability to gases and vapours. In this respect, porous compositions having a volume fraction of solid material of not more than about 0.1 are similar to compacted fibrous mats such as are used as filter elements for filtering aerosols or hydrosols or sols in other liquid media. The compositions having a volume fraction of solid material of about 0.2–0.8 are also highly permeable; in addition, they have the dimensional stability, resistance to tear, strength or compression; their surface, depending on the polymer used, is or can be easily made scuff, soil, and abrasion-resistant. As such, they are suitable for the preparation of breathable sheets. If the polymer is flexible but non-flowable at a temperature between about 0° C and 120° C, the high density porous composition can be used as a leather substitute. It can be permanently embossed to produce attractive leather-like materials suitable for use in shoe uppers, luggage, apparel, or for decorative purposes. The permeability to vapours can be adjusted to a desired value by compressing the composition or by treating with a non-volatile swelling agent. The permeability to water or other liquids can be similarly adjusted.

Porous compositions of this invention can be used as heat insulating material, dielectric material, sound barrier or vibration dampener. It can also be used for surgical dressings, to replace gauze and/or absorbent cotton; for that purpose, various bactericidal or medically active ingredients may be incorporated into the polymer-liquid systems prior to freezing and drying or they may be deposited in pores of the preformed compositions. The porous applications of this invention can further be used in all applications where porous materials are now used such as non-woven fabrics, paper substitutes, cushioning, liquid absorbing and holding devices such as wicks, inkers, oilers, etc.

The invention will be further illustrated by but not limited to the following examples.

EXAMPLE 1

A series of three freeze-drying runs were performed on a 5 percent solution in benzene of a crystalline polymer of isoprene. The polymer was a high molecular weight homopolymer of isoprene having a trans-1,4 content of more than 98 percent and an X-ray crystallinity of 30 percent measured at room temperature; it had a Mooney viscosity (ML-4' at 100° C) of 30 and a Shore C hardness of 75 points. The 5 percent solution in benzene was viscous but pourable at room temperature.

The solution was stored in a pressure vessel connected by a transfer line to a spacer forming a part of a closed mould. The mould consisted of two steel hollow plates each provided with fittings and lines for the recirculation of a coolant, and a 1.3 cm thick spacer between the plates. The spacer was provided with an overflow line which also could be used for the application of nitrogen pressure to the mould. A silicone treated paper was placed between the spacer and each of the two plates before they were bolted together to form a closed mould about 30 cm long, 30 cm wide and 1.3 cm thick.

The solution was pressured by nitrogen from the storage vessel into the mould until it was completely filled up to the overflow line. A nitrogen pressure was then applied to the overflow line and the solution was kept under pressure until it was frozen solid. The pressure was varied for different runs as is indicated in Table I. Next, the coolant recirculation pump was started and methanol, the temperature of which was controlled at a temperature between −39° C and −11° C, as shown in Table I, was recirculated through the hollow plates of the mould. The solution was frozen solid in less than 60 minutes, but in order to assure that substantially all benzene including that in the centre of the mould was frozen, the freezing continued for 90 minutes.

Thereafter, the mould was loosened, the spacer with the solidified polymer composition was removed from between the plates, silicone paper adhering to one side of the solidified polymer sheet was peeled off and the so exposed composition was quickly transferrd to a vacuum oven where a high vacuum was pulled by means of a vacuum pump to an absolute pressure of 20 mm Hg initially. After the initial period of about 15 minutes, the absolute pressure was reduced to about 7.5 to 10 mm Hg to speed the sublimation of benzene from the inner parts of the solidified composition. This procedure of stepwise evacuation produces porous compositions with more uniform surfaces. Benzene vapours were condensed in a dry ice trap placed between the oven and the vacuum pump.

TABLE I

| Runs | 6352 | 6359 | 6353 |
|---|---|---|---|
| Cooling Temperature (°C) | −11 | −32 | −39 |
| Pressure during cooling (atmosphere) | ⅓ | ⅔ | ⅓ |
| Drying time (hours) | 13 | 15 | 15 |
| Oven temperature (°C) | 12 | 12 | 12 |
| Density of porous compn. (g/cc) | 0.05 | 0.05 | 0.05 |
| Microphotograph | | | |
| Average cell size (microns) | 100 | not tested | 40 |
| Cell size spread (microns) | 50–180 | not tested | 20–90 |
| Average wall thickness (microns) | 5 | not tested | 4 |
| Cell structure | regular honeycomb | not tested | regular honeycomb |
| Appearance of porous composition | uniform matted surface free of faults and large pores | | |

All the products were stiff, but could be bent without breaking; they had satisfactory tear and stretch resistance but the compression resistance and recovery after compression were low.

The product of Run 6359 was tested for permeability using the following procedure. A plug of porous structure having a cross-section area of 0.32 cm² and a thickness of 1.15 cm was placed in a 0.6 cm tubing; the density of the plug was about 0.075 g/cm³. Air was passed through the tubing and the plug at a pressure of about 25 mm Hg and 50 mm Hg, respectively, above atmospheric pressure and collected. Time required to collect 100 cm³ of air was measured and a permeability constant was calculated using the following formula:

$$K = V \times L/T \times P \times A$$

where $K$ is permeability constant
$V$ is volume of air collected in cm³
$T$ is time in seconds required for said $V$
$P$ is pressure in mm Hg
$L$ is plug thickness in cm
$A$ is plug cross-section in cm²

The permeability constant for Run 6359 was calculated to be 0.58 and 0.54 on two determinations. It was approximately the same as that of a cellulose fiber plug of similar density.

A shredded sample of Run 6359 was also tested as a cigarette filter; with regard to the ease of draw and filtration efficiency it was found to be better than the polymeric filters known in the art except for the tendency to collapse when exposed to the temperature of smoking. This tendency was eliminated in a repeat Run 6359 performed on a trans-1,4 polyisoprene compounded with 2 php (parts per 100 parts by weight of polyisoprene) of dibenzyl amine and 0.8 phr of sulfur. The resulting porous composition was flushed for 5 minutes with 15 percent solution in acetone of dibutyl xanthogen disulfide, washed with acetone for 2 minutes and then cured at 45° C for 24 hours. The appearance and the properties of the product were identical to those of 6359 except for the improved recovery after manual compression. No collapse of cellular structure was observed at the temperature of about 60° C.

One additional run was performed on an 8 percent solution of trans-1,4 polyisoprene. The freezing was performed at atmospheric pressure, otherwise the freezing-drying process was carried out as in Run 6352. The porous sample was microphotographed: the average pore size was about 100 microns with pores ranging from 50 microns to about 250 microns and the average wall thickness was about 20 microns. Channels up to 600 microns in length were evident in the photographs and the surface showed a few minor imperfections.

These results in Table I indicate that the pore size decreased as the temperature of cooling was decreased.

They also show that a positive pressure during freezing is beneficial to the uniformity of the porous structure.

EXAMPLE 2

Three porous compositions of a linear block copolymer were prepared by freeze drying technique. The copolymer was a three block copolymer of the ABA type where A was a poly(alpha methyl styrene) block and B a poly(butadiene) block. The alpha methyl styrene content was 40 percent by weight and the length of both A's was approximately equal. The molecular weight of the copolymer was 85,000 and the intrinsic viscosity, measured in toluene at 30° C, was 0.80 dl/g. The copolymer was solid and had a second order transition temperature of about 150° C due to the presence of poly(alpha methyl styrene) blocks.

Two benzene solutions of the above copolymer were made; one contained 25 percent by weight of the copolymer and the other 30 percent. The 30 percent solution was divided in two parts and each part was freeze dried under different conditions noted in Table II.

The copolymer solutions were pressured from the storage vessel into a closed mould having the dimensions of about 30 cm × 30 cm × 0.2 cm. The mould consisted of a hollow base plate attached to a coolant recirculation system, a 0.2 cm thick spacer framing a cavity of 30 cm square and a cover plate provided with a one way valve (grease nipple) in the centre and bleed holes in four corners; the components were held together by three bolts on each side of the square. Before assembling the mould, the cover plate was coated with silicone grease and a silicone treated paper was placed between the base plate and the spacer. The solution was pressured through the valve; when it began to seep through the bleed holes indicating that the mould was completely filled, the flow of coolant was started through the hollow base plate. As the solution gradually solidified, the pressure on the solution feed was increased up to 1.4 atmosphere. After freezing, the mould was taken apart. The frozen solution supported on the cover plate was placed in the vacuum oven and the silicone paper was peeled off. Vacuum was applied and maintained at a level of less than 20 mm Hg for 90 minutes until all benzene sublimed.

In two runs, a sheet of a spun bonded polyester was inserted into the mould before it was assembled. The polyester sheet was wetted and saturated with solution and then freeze dried; a strong homogeneous porous sheet was produced. The conditions of freeze drying and test data for these three runs are shown in Table II.

TABLE II

| Run | 6320 | 6325 | 6340 |
|---|---|---|---|
| Solution concentration (% solids) | 30 | 30 | 25 |
| Reinforcing fabric (spun bonded polyester sheet) | yes | yes | no |
| Pressure during freezing (atm.) | ⅓ | 1.4 | ⅔ |
| Cooling temperature (°C) | −18 | −23 | −18 |
| Cooling time (minutes) | 30 | 20 | 30 |
| Oven temperature (°C) | 18 | 17 | 20 |
| Oven pressure (mm Hg) | 9 | 9 | 9 |
| Density (g/cm³) | not measured | not measured | 0.28 |
| Average cell size (microns) | not measured | 20 | 10 |
| Average wall thickness (microns) | not measured | 5 | 5–10 |

Uniform flexible porous compositions free of surface imperfections were obtained in each run. Microphotographs of the last two runs indicated that the cells were uniformly small. Porous compositions 6320 and 6325, both reinforced with non-woven polyester sheet, were extremely strong, did not stretch or tear in manual tests; they were as strong as the reinforcing spun bonded polyester sheet.

The non-reinforced composition was deficient in tensile strength, modulus and elongation: it was strengthened by pasting on one side of the composition the spun bonded polyester sheet used in Runs 6320 and 6325; the sheet was wetted in benzene, lightly pressed into the composition and benzene was evaporated. An excellent bond was achieved and the porous composition did not lose its porosity, but gained strength.

Sheet samples of Runs 6320, 6325 and 6340, all reinforced with spun bonded polyester in the manner as described and all compressed for 30 seconds in a press at 10° C and 3.0 kg/cm², were tested for air permeability using the procedure of Example 1 except for the change in the dimensions of the samples. Instead of a plug in tubing, a circular sheet having an area of 43.5 cm² and a thickness of 0.15 cm was used to block the passage of air at a pressure of 25.4 and 12.7 mm Hg, respectively. The permeability constant, calculated as in Example 1, was as follows:

| Run | Permeability Constant |
|---|---|
| 6320 | $40 \times 10^{-4}$ |
| 6325 | $25 \times 10^{-4}$ |
| 6340 | $40 \times 10^{-4}$ |
| Soft Leather A | $12 \times 10^{-4}$ |
| Soft Leather B | $8 \times 10^{-4}$ |
| Vinyl Leatherette | $8.5 \times 10^{-10}$ |

The above data show that 6325 composition, which was frozen at −23° C, was less permeable than either 6320 or 6340, both frozen at −18° C. Solids level in the solution used for freezing had no detectable effect on the permeability constant. All the porous compositions of this example were more permeable to air than natural leather of approximately the same thickness; they could be easily adjusted to the same permeability by compressing to the desired level. Vinyl leatherette was rather impermeable in comparison with natural leather and porous compositions prepared according to this invention.

EXAMPLE 3

Two porous compositions of linear block copolymers were also produced using the mould arrangement described in Example 1. In Run Y6187, the block copolymer was the three block copolymer of the ABA type described in Example 2. In Run No. 54, the block copolymer was a three block copolymer of the SBA type where S is a poly(styrene) block, B is a poly(butadiene) block and A is a poly(alpha methyl styrene) block. The composition of this copolymer was S:B:A as 22:55:23 by weight and the molecular weight was about 66,000.

40% by weight solutions of these two polymers were made and freeze dried under the conditions shown in Table III to produce 1.3 cm thick sheets.

TABLE III

| Run | Y6187 | 54 |
|---|---|---|
| Polymer | ABA | SBA |
| Cooling temperature (°C) | −11 | −70 |

| | | |
|---|---|---|
| Cooling time (minutes) | 60 | 190 |
| Oven temperature (°C) | 15 | 7 |
| Oven pressure (mm Hg) | 20 | 24 |
| Drying time (hours) | 7 | 9 |

Uniform flexible porous sheets free of surface imperfections were obtained in each case. The product has the appearance of a microcellular or "nuclear" shoe soling material. The products were subjected to a number of standard tests performed on microcellular shoe soling materials. The results shown in Table IV were obtained. For comparison, the Shoe and Allied Trader Research Association (SATRA) specifications for microcellular shoe soling are also included in Table IV.

TABLE IV

| | Run Y6187 | Run 54 | SATRA Spec. |
|---|---|---|---|
| Split tear (lb. per inch width) | 33.5 | 44 | minimum of 10 |
| Abrasion (%) | 11.0 | 33.8 | None |
| Hardness (Shore A-2) | 71.0 | 52.5 | minimum of 40 |
| Density (gms/cc) | 0.58 | 0.45 | maximum of 0.7 |
| Heat shrinkage % (1 week at 70°C) | 4.4 | not tested | None |
| Tensile strength (kg/cm$^2$) | 21 | 25 | minimum of 28 |
| Elongation (%) | 370 | 270 | minimum of 175 |
| Ross flex (K cycles) at R.T. | not tested | 36.5 | None |
| at 0°C | 38 | 37.5 | None |

These tests show the freeze dried block copolymers of the ABA and SBA type are suitable for use as microcellular shoe soling materials.

Further freeze drying experiments were performed with an isoprene-acrylonitrile copolymer containing 31 percent bound acrylonitrile and having a Mooney viscosity of 70, a high impact polystyrene, a terpolymer of acrylonitrile, butadiene and styrene and a polystyrene. In each case, a uniform porous composition was obtained which, depending on the properties of the polymer, was either flexible or stiff and could be used as a leather substitute, a filter material or an insulating material.

EXAMPLE 4

A 20% by weight solution of SAN resin in 1,4-dichlorobenzene was prepared in the following manner: 100 grams of resin was added to 400 grams of melted 1.4-dichlorobenzene and the mixture was stirred for 2 hours at 140° C. The resin was a copolymer of 72/28 styrene and acrylonitrile having a melt flow index of 6 grams/minute measured at 220° C. The warm solution was poured in an aluminum mould measuring 15 × 15 × 0.6 centimeters containing silicone release papers on the surfaces.

The mould was closed and placed between the plates of a hydraulic press at a pressure of about 1,750 atmospheres for 2 minutes at 55° C and then for 5 minutes at 10° C until the contents froze to a solid state. The frozen sample was removed from the mould and placed on a support screen in the vacuum chamber of a sublimation apparatus. The area below the sample was heated by a coil through which was circulated a fluid at 71° C. A vacuum of 2 mm Hg was applied to the chamber to prevent melting and effect the sublimation of the solvent. The sublimed 1,4-dichlorobenzene was condensed on a cold surface maintained at 5° C provided within the apparatus. The process was continued for 15 hours until the sample was dry and free of dichlorobenzene and a porous block having a density of 0.365 grams/cm$^3$ was produced.

In a like manner, but employing a mould measuring 10 × 10 × 0.1 centimeters, two porous sheet samples were also prepared; one was a pure SAN resin and had a density of 0.381 grams/cm$^3$ and the other sheet was reinforced with a spun bonded polyester mat inserted into the mould before freezing.

The samples were tested for tensile strength and elongation as well as air permeability. The last test was performed on circular specimens, 2.54 cm in diameter and of thickness as obtained in the mould. The results are presented in Table V.

TABLE V

| | Block | Sheet | Reinforced Sheet |
|---|---|---|---|
| Tensile Strength (kg/cm$^2$) | 28 | 28 | 44 |
| Elongation (%) | 2.4 | 5 | 5 |
| Permeability Constant | 61×10$^{-3}$ | 18×10$^{-3}$ | 20×10$^{-3}$ |

The block sample was additionally tested for flexural strength, flexural modulus. Compressive strength and ball indentation and the following results were obtained:

| | |
|---|---|
| flexural strength (kg/cm$^2$) | 20 (ASTM D-790-66 Method A) |
| flexural modulus (kg/cm$^2$) | 1,390 (ASTM D-790-66 Method A) |
| compressive strength (%) | 55 * |
| ball indentation (kg) | 44 ** |

*Compressive strength is the percentage compression of a 1×1 cm sample when a 100 kg load is applied at a rate of 0.2 cm/min.
**Ball indentation is the load in kg required to press a 0.953 cm diameter ball into the sample, a distance of 0.476 cm at a speed of 0.2 cm/min.

EXAMPLE 5

A porous block sample of Phenoxy resin was produced from a 10 percent by weight solution of Phenoxy resin in 1,4-dichlorobenzene in a manner as described in Example 4. Phenoxy resin was a Bakelite brand injection moulding resin having an impact strength of 2-5 ft. lbs. at 77° F, heat distortion of 188° F at 284 psi and 196° F at 66 psi.

The block sample was tested as described in Example 4 and the results were as follows:

| | | |
|---|---|---|
| Density | grams/cm$^3$ | 0.175 |
| Tensile Strength | kg/cm$^2$ | 7.5 |
| Elongation | (%) | 14 |
| Flexural Strength | kg/cm$^2$ | 13 |
| Flexural Modulus | kg/cm$^2$ | 600 |
| Compressive Strength | (%) | 81.5 |
| Ball Indentation | (kg) | 29 |
| Air Permeability Constant | | 23.5×10$^{-2}$ |

The block samples of Examples 4 and 5 have a low density of 0.365 and 0.175 grams/cm$^3$, respectively, and yet they are stiff, strong to resist compression and indentation and as such they are suitable for use in construction as insulating materials for sound or heat.

EXAMPLE 6

A mixture of equal amounts of three polymers was dissolved in 1,4-dichlorobenzene to produce a 26.5 percent solution. The polymers were:
1. a thermoplastic homopolymer of vinyl chloride (PVC)
2. a thermoplastic graft polymer of acrylonitrile, butadiene and styrene (ABS)

and 3. a rubbery copolymer of butadiene and acrylonitrile.

The solution was frozen in the thin mould of Example 4 and two samples were prepared using during freezing a pressure of about 700 atmospheres and 70 atmospheres, respectively. The two sheet samples were tested as described above and the results were as follows:

| Sheet | A | B |
|---|---|---|
| Pressure during freezing (atmospheres) | 700 | 70 |
| Density (grams/cm$^3$) | 0.619 | 0.580 |
| Tensile Strength (kg/cm$^2$) | 103 | 60 |
| Elongation (%) | 80 | 70 |
| Permeability Constant | $4.9 \times 10^{-7}$ | $1.5 \times 10^{-5}$ |

This example shows that an air permeable composition can be prepared with adequate tensile srength without the use of reinforcing material.

What is claimed is:

1. A process for the production of a porous polymeric material comprising preparing a solution from at least one non-flowable organic polymeric resin selected from the group consisting of thermoplastic polymers having a second order transition point of more than about $-25°$ C and consisting of polystyrene, butadiene styrene copolymers, isoprene-acrylonitrile copolymers, vinyl chloride polymers, styrene-acrylonitrile copolymers, styrene-acrylonitrile-butadiene terpolymers, block copolymers of vinylidene aromatic hydrocarbons with conjugated diolefins of the ABA type where A is a polymeric block having a second order transition point of more than about $-25°$ C and B is a polymeric block of conjugated diolefin and mixtures thereof, and high molecular weight amorphous polymers of low second order transition point and essentially free of cold flow selected from polybutadiene and butadiene copolymers and isoprene copolymers with minor amounts of styrene or acrylonitrile, and an organic solvent capable of freezing to a crystalline state and selected from the group consisting of hydrocarbons consisting of benzene, toluene, cyclohexane and octane and halogenated hydrocarbons consisting of perchloroethylene, dichlorobenzene and carbon tetrachloride, freezing said solution and subjecting it to a compacting force during the freezing, whereby a compacted solidified polymeric material is formed, said solidified polymeric material having homogeneously dispersed therein solvent crystals, and removing by sublimation substantially all of said solvent.

2. The process according to claim 1 in which the compacted polymeric material comprises from about 0.5 to about 80 percent by weight of said polymeric resin and from about 20 to about 99.5 percent by weight of a solvent for said material.

3. The process according to claim 1 in which said solution during freezing is cooled to a temperature at least 10° C below the freezing temperature of said organic solvent.

4. The process according to claim 1 in which the compacted polymeric material comprising about 20–60 percent by weight of said polymeric resin having a second order transition temperature of not less than about 10° C and about 80–40 percent of said organic solvent for said resin is formed into a sheet and is subjected to a temperature and pressure below the triple point of said solvent whereby the solvent crystals sublime and a porous sheet is produced having pores of less than 500 microns in width.

5. The process according to claim 4 in which the sheet of compacted polymeric material has added thereto before freezing containing a fibrous reinforcement in order to form a reinforced porous polymeric sheet.

6. The process according to claim 1 in which the organic solvent is selected from the group consisting of benzene, cyclohexane, 1-4-dichlorobenzene.

* * * * *